(12) United States Patent
Friedrick et al.

(10) Patent No.: US 8,141,614 B2
(45) Date of Patent: Mar. 27, 2012

(54) EXPANDING COUPLING MEANS FOR POWERED WINDOW COVERING

(75) Inventors: Joel Friedrick, San Diego, CA (US); Sarah Reymond, San Diego, CA (US); Adrien Brondex, Domancy (FR); Jean Pierre Lefebvre, Chatillon sur Cluses (FR); Miguel Leleu, Les Carroz d'Araches (FR); Eric Lagarde, Sallanches (FR)

(73) Assignee: Harmonic Design, Poway, CA (US)

( * ) Notice: Subject to any disclaimer, the term of this patent is extended or adjusted under 35 U.S.C. 154(b) by 125 days.

(21) Appl. No.: 12/496,304

(22) Filed: Jul. 1, 2009

(65) Prior Publication Data
US 2011/0000629 A1 Jan. 6, 2011

(51) Int. Cl.
*E06B 9/32* (2006.01)

(52) U.S. Cl. .... 160/168.1 P; 160/178.1 R; 160/178.1 V; 160/84.02; 160/310; 248/638; 267/136; 267/140.11

(58) Field of Classification Search ........... 160/178.1 R, 160/178.1 V, 168.1 P, 176.1 P, 84.02, 310; 248/638; 267/136, 140.11, 141; 188/378–380
See application file for complete search history.

(56) References Cited

U.S. PATENT DOCUMENTS

| | | | | |
|---|---|---|---|---|
| 2,670,532 A * | 3/1954 | Lorentzen | ........................ | 29/271 |
| 4,825,983 A * | 5/1989 | Nakanishi | ..................... | 188/378 |
| 4,887,657 A * | 12/1989 | Spohr | .................... | 160/178.1 R |
| 5,022,453 A * | 6/1991 | Rozon | ..................... | 160/168.1 R |
| 5,025,681 A * | 6/1991 | Andra | .......................... | 74/574.4 |
| 5,071,137 A * | 12/1991 | McCloud | .................. | 273/108.52 |
| 5,735,257 A * | 4/1998 | Walk | ................................ | 124/89 |
| 5,769,399 A * | 6/1998 | Fiedler | ..................... | 267/140.11 |
| 6,263,945 B1 * | 7/2001 | Nien | ........................ | 160/173 R |
| 6,497,267 B1 * | 12/2002 | Azar et al. | .................... | 160/310 |
| 6,499,730 B1 * | 12/2002 | Kuwayama et al. | .......... | 267/141 |
| 6,615,895 B2 * | 9/2003 | Marocco | .................. | 160/173 R |
| 6,857,623 B2 * | 2/2005 | Kuwayama | ................ | 267/141.3 |
| 7,659,645 B2 * | 2/2010 | Bi | .................................. | 310/51 |
| 7,737,583 B2 * | 6/2010 | Bi | .................................... | 310/51 |
| 2003/0155697 A1 * | 8/2003 | Haneishi et al. | ......... | 267/140.11 |
| 2008/0265698 A1 * | 10/2008 | Bi | .................................. | 310/51 |
| 2008/0284274 A1 * | 11/2008 | Bi | .................................. | 310/261 |
| 2009/0000749 A1 * | 1/2009 | Amann et al. | .......... | 160/168.1 P |
| 2011/0042546 A1 * | 2/2011 | Beatty et al. | .................. | 248/603 |

FOREIGN PATENT DOCUMENTS

AU  2008100304 A4  5/2008
EP  1321623 A1  6/2003

* cited by examiner

*Primary Examiner* — Blair M Johnson
*Assistant Examiner* — Marcus Menezes
(74) *Attorney, Agent, or Firm* — Procopio, Cory, Hargreaves & Savitch LLP; Noel C. Gillespie

(57) ABSTRACT

An actuator to be inserted in a headrail of a window covering, the actuator comprises a damping body configured to reduce vibrations when the actuator is operating, and an expanding mechanism configured to expand the damping body against the headrail.

20 Claims, 14 Drawing Sheets

EXPANDING COUPLING MEANS FOR POWERED WINDOW COVERING

BACKGROUND

1. Technical Field

The embodiments described herein generally relate to motorized window coverings, and more particular to reducing noise and vibrations created by a motorized window covering.

2. Related Art

A problem with conventional motorized window coverings is transmission of vibrations induced in the motor, in particular "solidborne" transmission of vibrations. These vibrations can create operational problems as well as unacceptable noise levels. Typically, it is very important to reduce the noise emitted by such devices. For example, the emitted noise should be below 50 decibels.

The motor and other mechanical accessories of such motorized window coverings are usually included in a headrail, made of a metal sheet, such as steel or aluminium. Such a conventional headrail is often neither closed nor rigid. The transmission of vibrations from the motor to the headrail may activate vibration resonant modes of the headrail or at least will allow the radiation of vibrations upon the whole headrail surface with a strong amplification effect.

Consequently, damping accessories that provide viscoelastic suspension and/or viscoelastic transmission are often used with such devices to minimize the solidborne transmission. For example, the Australian patent application 2008100304 discloses a motorized shade assembly. A vibration-absorbing member is made of a buffering, flexible material and includes a central hole clamping the motor. The outer periphery of this member is pressed against the inner periphery of the headrail.

The US patent application 2009/0000749 discloses a drive unit for a Venetian blind or the like. The drive unit includes an electric motor, one or two gear units, and two output shafts. The motor casing is made with components, isolating coating, and damping plugs that provide acoustical damping and uncoupling and that are shaped to be insertable into the headrail.

EP 1 321 623 discloses a mounting apparatus for an electromotor installed in a U-shaped headrail including flexible vibration-damping bodies attached on the ends of mounting feet provided on the electromotor. A U-shaped clip is attached around the headrail between the two mounting feet and includes a clamping device that allows exerting a pressure on the electromotor.

It is then common to include vibration-damping bodies around a drive unit before inserting it in a window covering headrail. It should be noted that a conventional horizontal headrail is usually U-shaped. Accordingly, the drive unit, with vibration damping bodies, may be inserted in the headrail either laterally or vertically.

A problem with conventional damping suspension devices, such as those disclosed in the patents and patent applications discussed above is that they require a certain amount of stress or strain between the drive unit and the headrail to operate properly. In other words, if the damping devices are too lose when the drive unit is installed in the headrail, then they cannot provide adequate dampening; however, when the damping devices are sized to achieve the necessary stress or strain, then a certain amount of friction is created that makes it difficult to move the drive unit inside the headrail. On the other hand, if the friction is reduced, then the damping devices may not adequately dampen vibrations, the drive unit may not be adequately stabilized within the headrail, or both.

For example, in AU 2008100304 the interface between the vibration-absorbing member and the housing is quite small because of the circular configuration of ribs, which creates only tangential contact, and there are large gaps between the housing and most of the member in order to reduce friction. Axial holes in some of the ribs may further diminish the friction. But four screws traversing the headrail are needed to secure the drive unit in the housing.

In US 2009/0000749, a provision is made for leaving room between the isolating coatings and the headrail and the same considerations apply to damping plugs. But how the drive unit is kept tight into the headrail is not addressed, nor is it clear from the disclosure.

In EP 1 321 623 a means to secure the clip by exerting a pressure on the motor with an appropriate tool is disclosed. The clip tightens the headrail and compresses the vibration-damping bodies to provide the necessary stress or strain while allowing the drive unit to move within the headrail when the external clip is not in place. But the aesthetic result when the clip is installed is poor.

SUMMARY

A powered window covering system that reduces vibrations and allows easy positioning of an actuator within a headrail is disclosed herein.

According to one aspect, an actuator comprises a damping body configured to reduce vibrations when the actuator is operating, and an expanding mechanism configured to expand the damping body against the headrail.

The expanding mechanism can comprise one or more spikes, a bolt and nut combination, an ovoid body, or a rotating body. The damping body can comprise holes or other receiving mechanisms for receiving the expanding mechanism.

The expanding mechanism has a rest position in which the expanding mechanism is coupled with the damping body but is not acting to expand the damping body against the headrail.

According to another aspect, a powered window covering system comprises a headrail; and an actuator to be inserted in the headrail, the actuator comprising a damping body configured to reduce vibrations when the actuator is operating, and an expanding mechanism configured to expand the damping body against the headrail.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
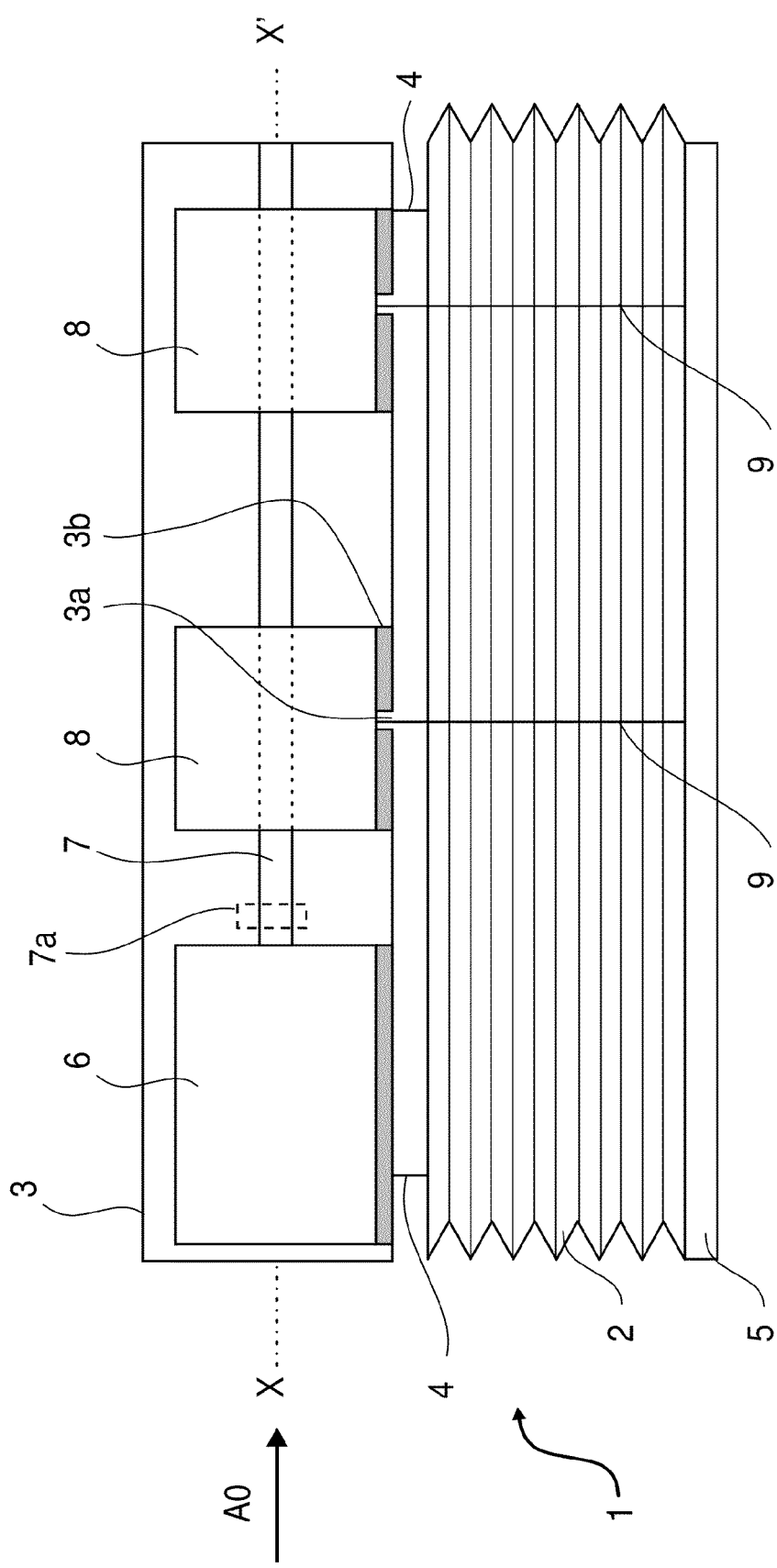
FIG. 1 is a schematic diagram illustrating an example powered window covering according to one embodiment.

FIG. 1 is a schematic diagram illustrating an example powered window covering 1 according to one embodiment. In the example of FIG. 1, the powered window covering includes a mobile screen 2, e.g., a Venetian blind, a pleated shade, a Roman shade, etc., and a headrail 3. The top part of the screen 2 is connected to the headrail 3 by fixed links 4, and the bottom part of the screen 2 is connected to a load bar 5, which ensures a given tension upon the screen 2.

The headrail 3 can be configured to house several actuators such as a motor 6 and winding devices 8, each connected to a rotating shaft 7. The axis X-X' of the shaft 7 is normally horizontal. In FIG. 1, the motor 6 is at one end of the headrail 3 but it can alternatively be positioned at the other end or in a central position, e.g., with two outputs connected to two shafts. An advantage of having the motor at one end of the headrail is an easier maintenance or cabling. It may also facilitate clamping the motor as seen hereafter.

The load bar 5 can be attached to cords 9, which are linked to winding devices 8 through holes 3a the headrail 3. The cords 9 can be wound or unwound by winding devices 8 according to the direction of rotation of the shaft 7, enabling an upward or downward motion of the load bar 5.

Grey areas 3b in FIG. 1 are the contact areas where motor 6 and winding devices 8 contact the headrail 3. It can be preferable for contact areas 3b to be as small as possible in order to reduce noise and vibration; however, contact areas 3b must be sufficient to maintain the outward pressure needed to hold the motor 6 and winding device 8 in place. Accordingly, while the size of area 3b can change based on the needs of a particular implementation, it should be sufficient to maintain the outward pressure needed and to prevent vibration as described below.

Vibrations of the motor 6 can excite the headrail 3 either directly or indirectly. Indirect excitation happens through a solid path from the motor 6 to the headrail 3 made of the shaft 7 and the winding device 8. This is why, for example, the shaft 7 is often linked to the output of the motor 6 by uncoupling means 7a. It will be understood that such uncoupling means 7a can act to reduce vibrations along the solid path described above; however, the efficiency of uncoupling means 7a is not always enough to sufficiently reduce vibrations along the solid, indirect path.

Accordingly, the damping devices described below can be used to prevent or further prevent such vibration. The damping devices described herein can be used in conjunction with both the motor 6, winding devices 8, or both, and can be used in conjunction with many variations of such motors or winding devices; however, for cost and simplicity, it can be preferable to use the damping devices with only the motor 6, with or without uncoupling means 7a on the shaft 7.

Figure 2:
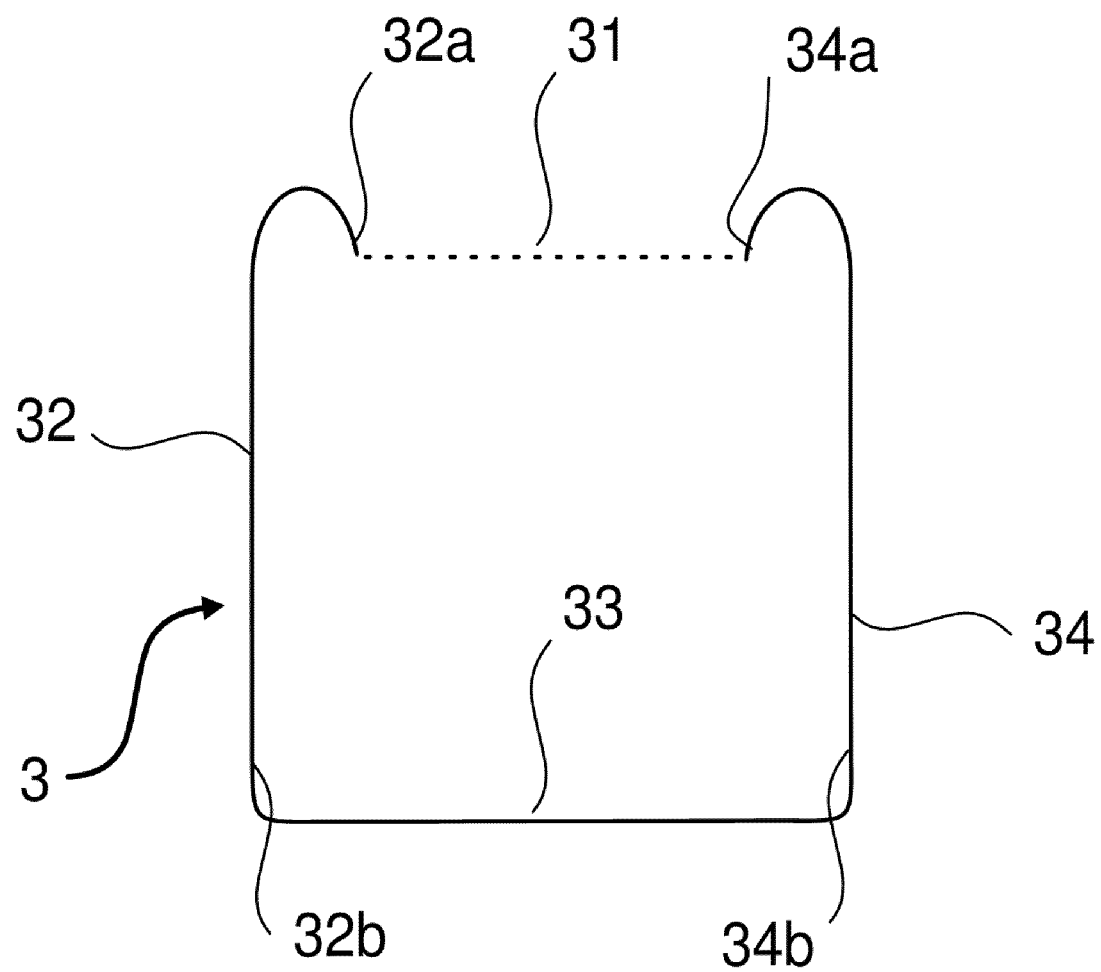
FIG. 2 shows a cross section of a headrail included in the powered window covering of FIG. 1.

FIG. 2 shows a cross section of the headrail 3 in a vertical plane, the headrail axis being parallel to the shaft axis and horizontal. The direction of view is indicated on FIG. 1 with a horizontal arrow labelled A0.

The headrail 3 can be made from a folded metal sheet and can exhibit a U-shaped profile, opened on the top surface 31, as seen in FIG. 2. The headrail 3 can comprise a left lateral surface 32 and a right lateral surface 34 linked to a bottom surface 33. The top ends, respectively 32a and 34a, of lateral surfaces 32 and 34 can be bent inwards as illustrated. The lower portions 32b and 34b of lateral surfaces 32 and 34 respectively are located near the bottom surface 33 and can exhibit a high rigidity. Alternatively, mainly in the case of "Roman shades" window coverings, the U shape profile of headrail 3 can be rotated 180 degrees such that it opens downward.

Figure 3:
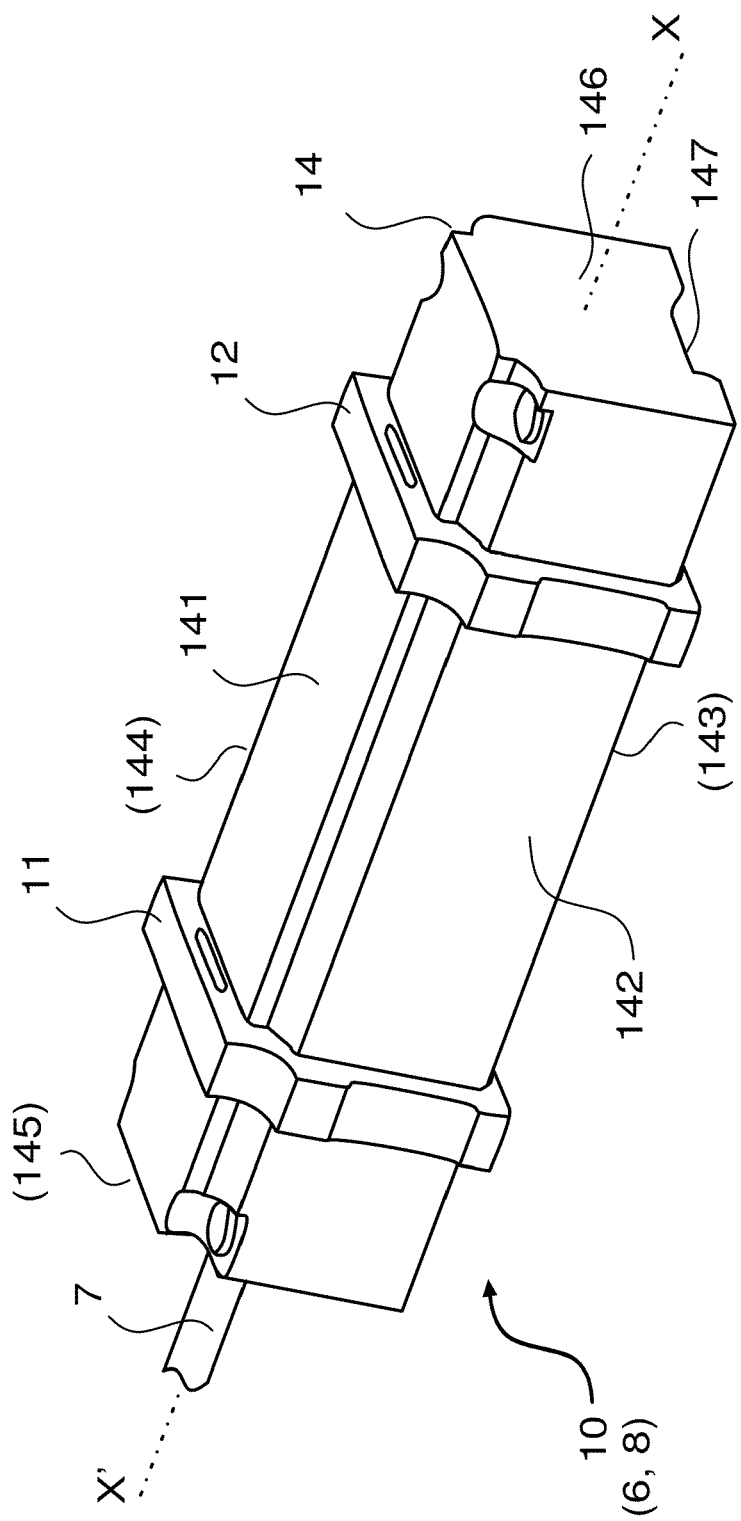
FIG. 3 is a diagram illustrating an example embodiment of an actuator and damping bodies included in the powered window covering of FIG. 1 and that can be position within the headrail of FIG. 2 in accordance with one embodiment.

Actuators 6 and 8 can then be placed within the headrail 3. FIG. 3 is a diagram illustrating an example actuator 10 that can be included in the headrail 3 in accordance with one embodiment. The actuator 10 can, e.g., be the motor 6, with a shaft output (not visible) connected to the shaft 7. Alternatively, it can be a winding device 8 and can be connected to two shafts or connected to a traversing shaft depending on the implementation.

The actuator 10 can include a first damping body 11 and a second damping body 12 surrounding a rectangular casing 14, the length of which is oriented in the X-X' direction. The casing 14 can comprise a top face 141, a left face 142, a bottom face 143 (hidden) and a right face (hidden). The casing 14 can also include a front face 145 (hidden) and a rear face 146. The front face 145, or both the front face 145 and the rear face 146 can include a shaft output to accommodate shaft 7. A bottom recess 147 on the rear face 146 and axially on the bottom face 143 can provide a larger space between the casing 14 and the headrail 3 in the recessed area.

Casing 14 and damping bodies 11 and 12 are configured such that actuator 10 can be easily inserted and positioned within headrail 3. Once in place, an expanding mechanism can be inserted into damping bodies 11 and 12 in order to create adequate pressure against headrail 3 to hold actuator 10 in place.

Figure 4:
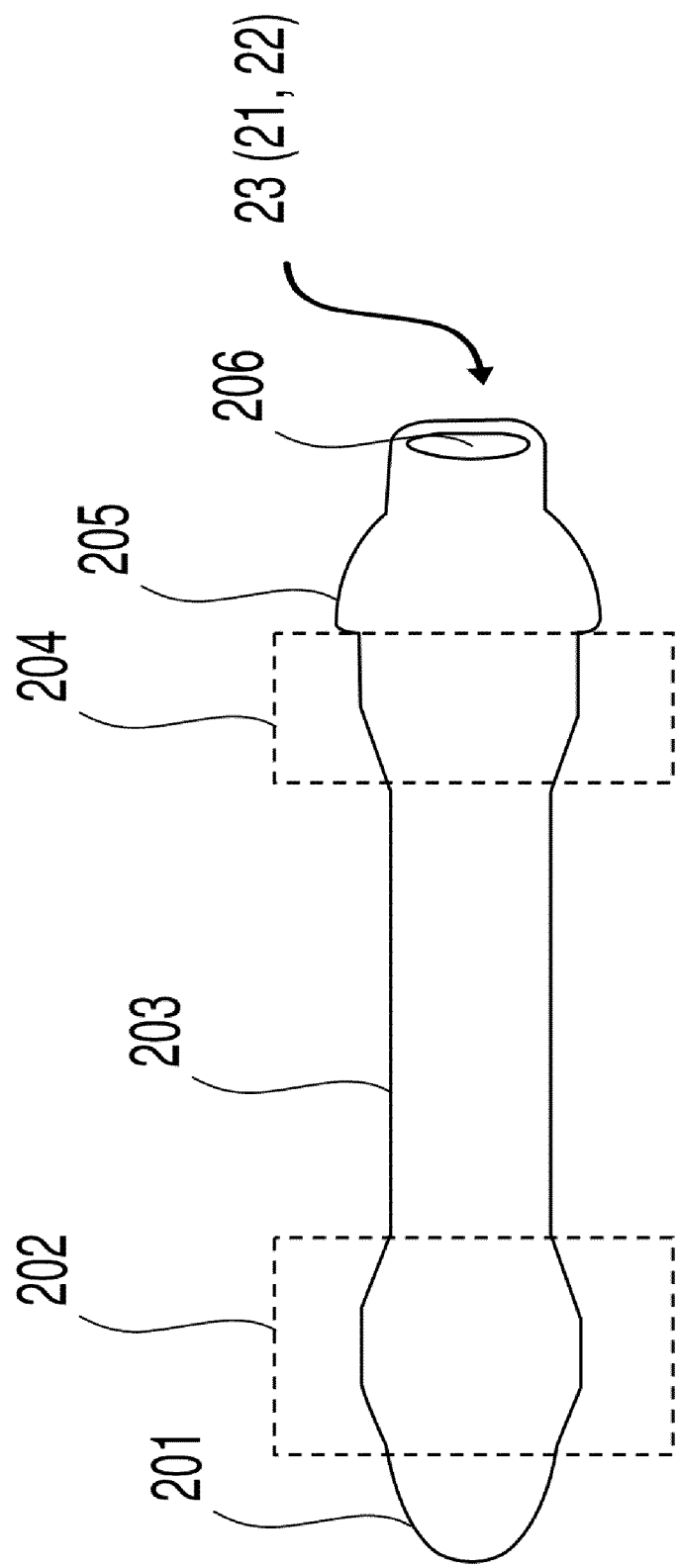
FIG. 4 is a diagram illustrating an example expanding mechanism that can be used in conjunction with the damping bodies of FIG. 3 in accordance with one embodiment.

FIG. 4 is a diagram illustrating an example expanding mechanism 23 comprising two similar spikes 21 and 22 that can be used to laterally expand the damping bodies 11 and 12 and create the required pressure. Each spike 21 and 22 can be, for instance, made of a 2 mm thick sheet of rigid plastic. Each spike 21 and 22 can further include a tapered opening section 201, a first expanded section 202, a constant-width section 203, a second expanded section 204, a mechanical stop 205, and an extracting hole 206. The length of each spike 21 and 22 can be substantially equal to the length of the actuator 10 in the axial direction. The distance between the expanded sections should be equal to the distance between the damping bodies 11 and 12, as the spikes are configured such that the expanded sections will reside with in the damping bodies 11 and 12 when the spikes 21 and 22 are inserted therein. The width of the opening section 201 at its widest point can be equal to the width of the constant width section 203.

Figure 5:
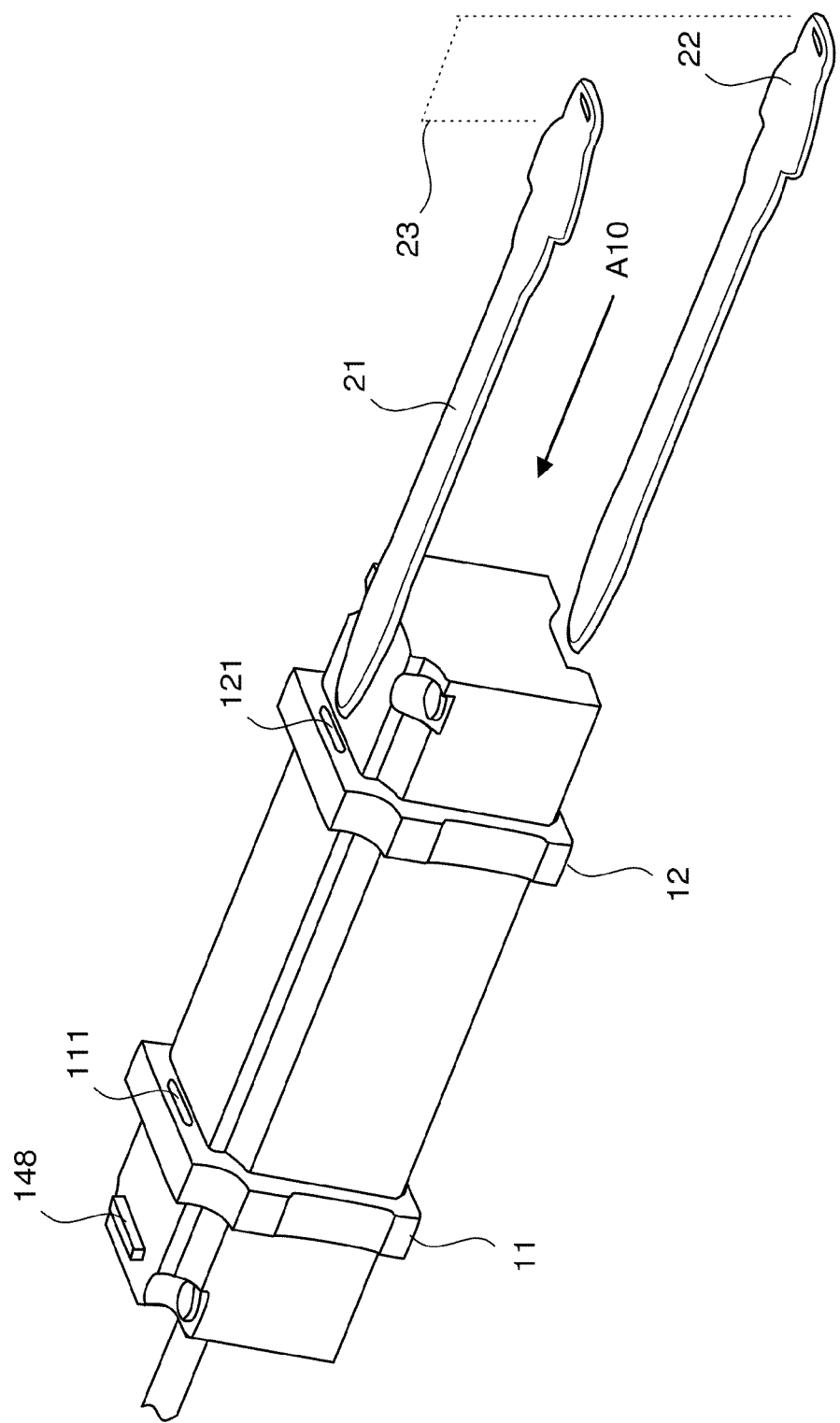
FIG. 5 is a diagram illustrating an example assembly process for inserting expanding mechanism of FIG. 4 into the damping bodies of FIG. 3 in accordance with one embodiment.

FIG. 5 is a diagram illustrating an example assembly process for inserting the expanding mechanism 23 in the damping bodies 11 and 12. Damping bodies 11 and 12 can be made form rubber or viscoelastic material. As can be seen, the first damping body 11 can comprise two flat holes configured to accommodate spikes 21 and 22. One of these flat holes 11 is illustrated in FIG. 5, where the other is not shown because it is positioned underneath casing 14. Similarly, the second damping body 12 comprises two flat holes, one hole 121 illustrated in top of casing 14 and another not illustrated underneath casing 14. A protrusion 148 on the casing 14 can also be included to act as a spike stop.

Flat holes 111 and 121, and the corresponding holes underneath casing 14, can be substantially rectangular, with a width equal to the width of the constant-width section 203 and a height equal or less to the thickness of each spike 21 and 22. Spikes 21 and 22 can be inserted in the axial direction simply by pushing them into the flat holes in the direction of arrow A10. The bottom recess 147 facilitates insertion of, e.g., spike 22, by leaving a sufficient space between the casing 14 and the headrail 3 to accommodate the spike 22.

When the first expanded section 202 of the first spike 21 enters the flat hole 121, it induces expansion of the rubber or viscoelastic material of the second damping body 12. If the pushing action is maintained, then the first expanded section 202 totally passes through the second damping body 12 and then the constant-width section 203 should slide easily through the flat hole 121 due to its reduced width.

In certain embodiments, the pushing action is ended before the spike 21 is totally inserted, namely when the tapered opening section 201 enters the first flat hole 111. In that situation, no stress or strain is applied to the two damping bodies 11 and 12. The same will be done for the second spike 22.

Then the actuator 10 set is complete and remains easy to manipulate when inserting in headrail 3. Even when included in the headrail 3, it can be moved easily in the axial direction. When the spike are in this position, i.e., not totally inserted, then this is referred as the "rest position" of the expansion mechanism 23, as depicted in FIG. 13.

It can be preferable for the actuators 10 to be provided to the installer in the rest position. The first pushing action is then made at the factory.

Figure 13:
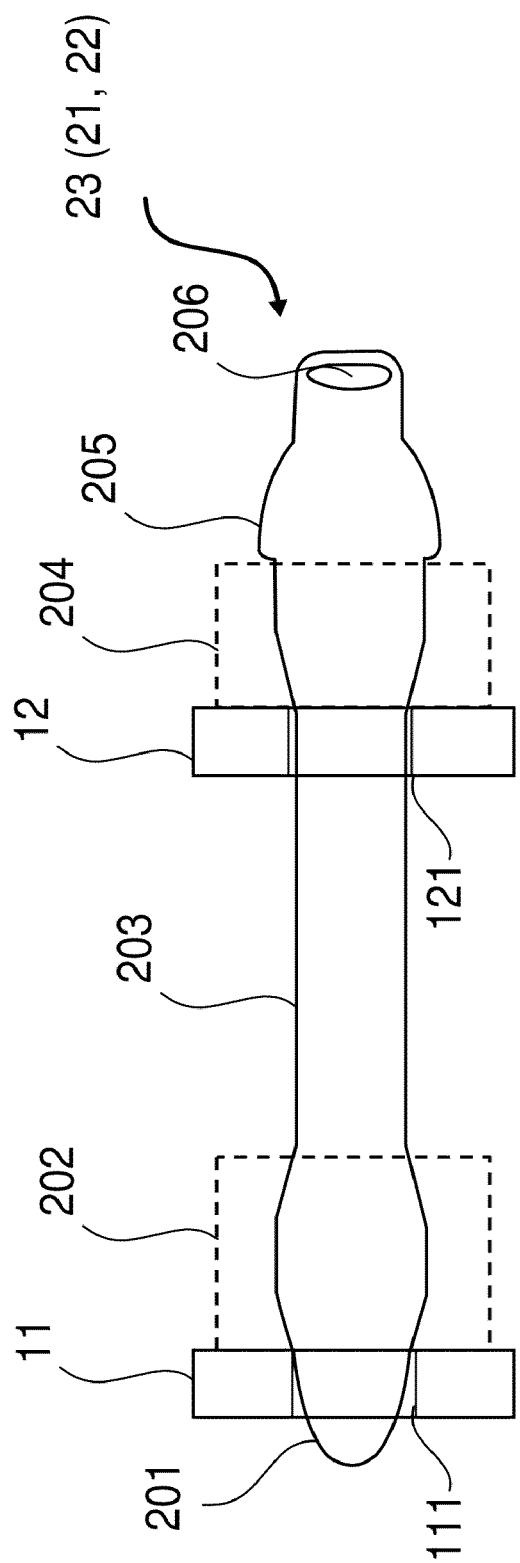
FIG. 13 is a diagram illustrating the "rest position" of expanding mechanism of FIG. 4.

FIG. 13 shows how the expansion mechanism 23 can be maintained in the actuator 10 in the rest position, where the damping bodies 11 and 12 are shown as transparent. The opening section 201 has been inserted in the flat hole 111 of the first damping body 11. As the size of each hole is just equal to the larger size of the opening section, the friction of the spike with both holes, and mainly with the second flat hole 121, can be enough to maintain the spike in its rest position, even when the actuator 10 is manipulated rapidly by the installer.

Figure 6:
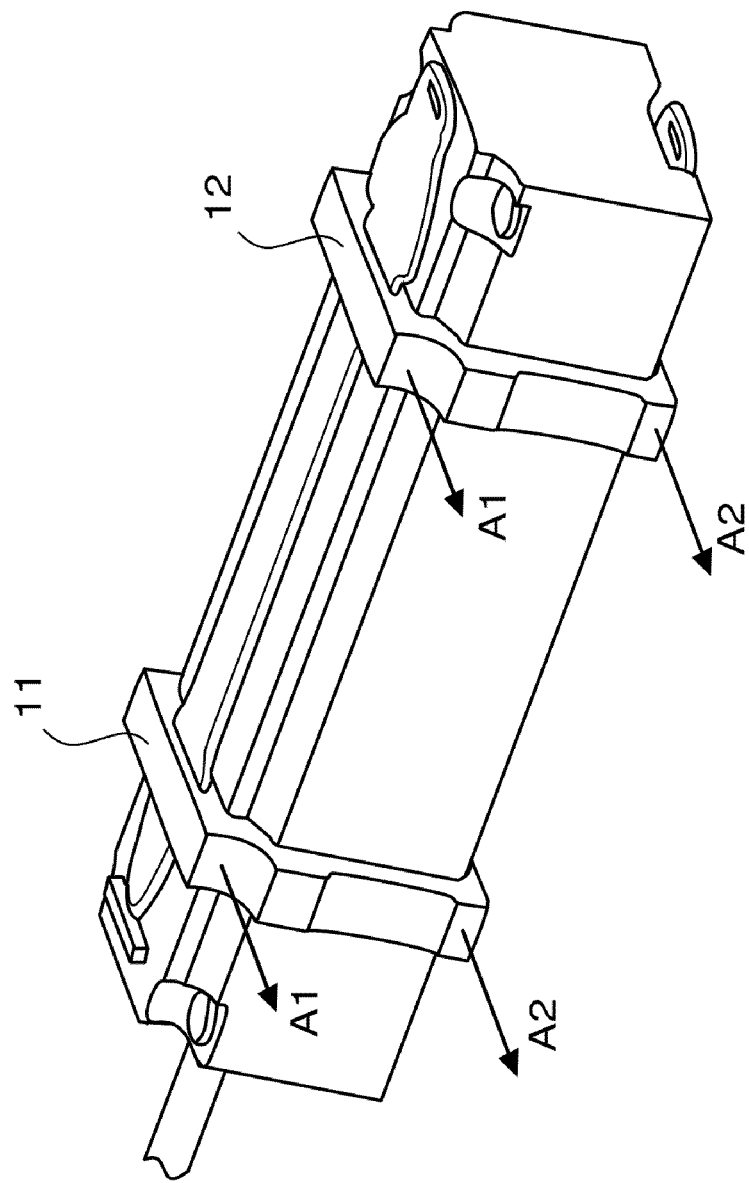
FIG. 6 is a diagram illustrating the expanding mechanism of FIG. 4 in the mounted position.

FIG. 6 illustrating the actuator 10 in a mounted position. A second pushing action in the A10 direction results in each expanded section 202 and 204 coming to rest within the respective flat hole, e.g., flat holes 111 and 121 for spike 21. The mechanical stop 205 and the spike stop 148 prevent further pushing. Then, each upper part of the damping bodies 11 and 12 are expanded laterally as shown by arrows A1, and each lower part of the damping bodies 11 and 12 is also expanded laterally as shown by arrows A2. This is referred as the "clamped position" or "mounted position" of the expansion mechanism 23.

Figure 7:
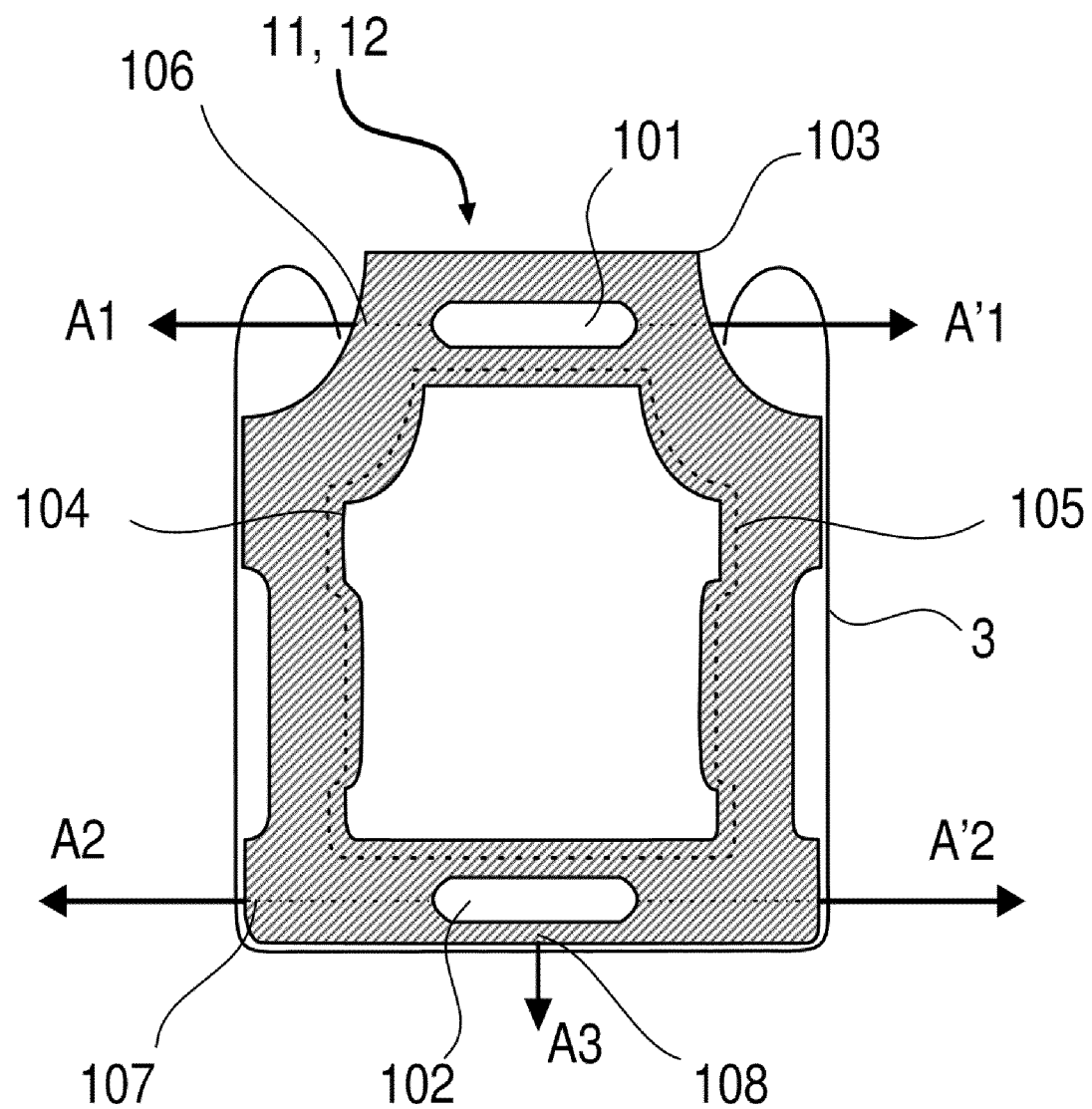
FIG. 7 is a cross-section view of the actuator of FIG. 3 inserted in the headrail of FIG. 2.

FIG. 7 is a cross-section view actuator 10, when inserted in the headrail 3. The casing 14 and inner parts of the actuator 10 are not shown for simplicity. Generic references are used, starting with numbers 1 and 0: for instance an upper flat hole 101 will become 111 if referring to the first damping body 11 and will become 121 if referring to the second damping body 12. Same for a lower flat hole 102, leading to 112 and 122. The damping body 11,12 includes an outer shape 103 adapted to fit within the headrail profile and includes an inner shape 104 adapted to fit within a grove included in the actuator casing 14. A dashed line shows the external profile 104 of the rest of the actuator casing 14 not including the grooves. An advantage of groves is to maintain each damping body in a given axial position.

A first lateral expansion area 106 is in the horizontal extension of the upper flat hole 101 and causes the damping body 11,12 to press against the top end 32a of the headrail 3 when the expanded section 202,204 of the spike 21 is inserted in the upper flat hole (arrow A1). The same thing happens on the right side (arrow A'1).

A second lateral expansion area 107 is in the horizontal extension of the lower flat hole 102 and causes the damping body 11,12 to press against the lower left lateral surface 32b of the headrail when the expanded section 202,204 of the spike 22 is inserted in the lower flat hole 102 (arrow A2). The same exists on the right side (arrow A'2).

As the lower parts 32a and 32b of the headrail 3 are rigid, the actuator 10 is efficiently clamped in the headrail 3 by the second lateral expansion 107 areas as soon as the spike 22 is fully inserted.

As shown by the arrow A3, a strain and/or stress can also be created in a bottom expansion area 108 if the thickness of the spike 22 is greater than the flat hole height.

Figure 8:
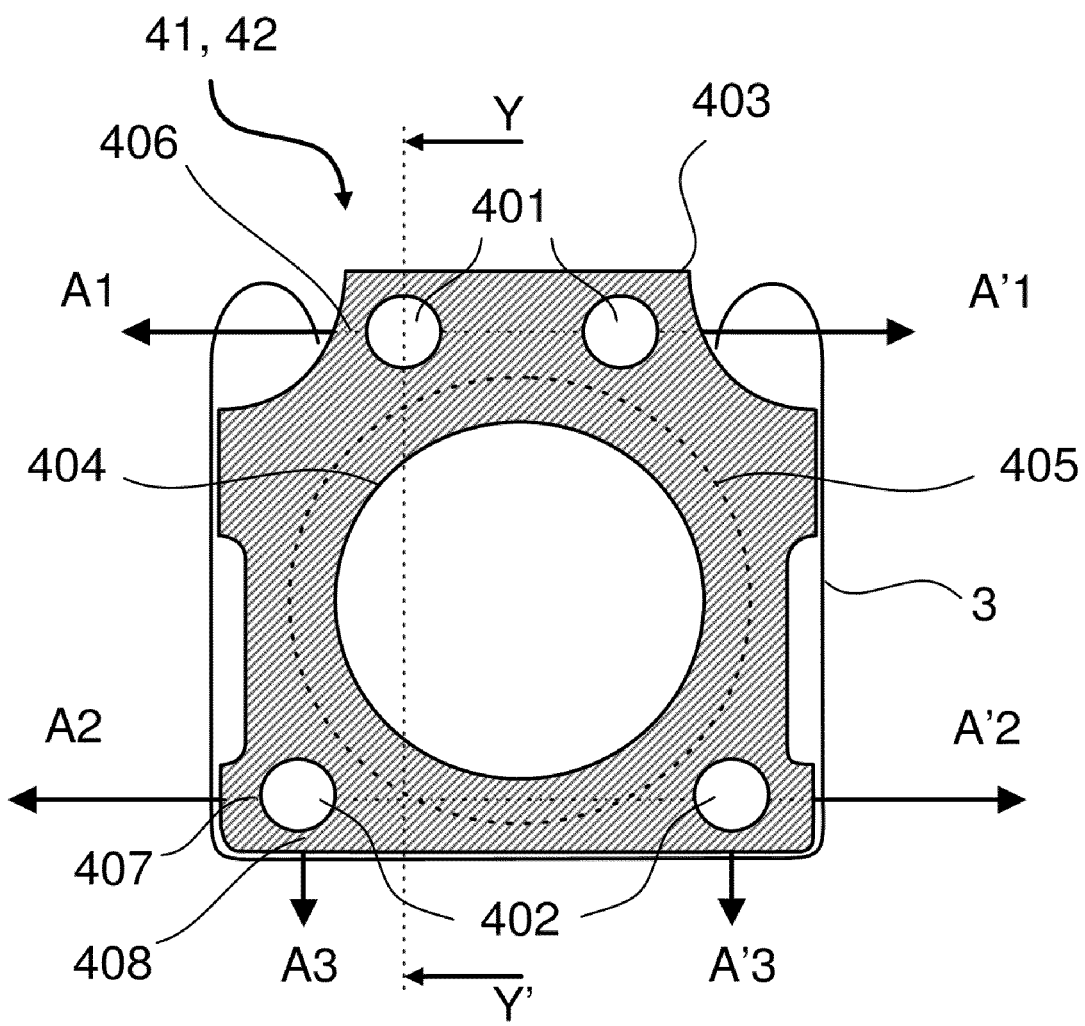
FIG. 8 is a cross-section view of the actuator of FIG. 3 inserted in the headrail of FIG. 2, wherein the actuator includes a damping body configured in accordance with another example embodiment.

FIG. 8 is a cross-sectional view of another example type of damping body 41,42 that can be used in conjunction with another type of actuator in accordance with another embodiment. In the example of FIG. 8, the actuator is not shown as in FIG. 7. Further, the damping body 41,42 is shown installed in headrail 3.

In the embodiment of FIG. 8, damping body 41,42 includes upper and lower cylindrical holes 401 and 402 respectively. As with damping body 11,12, a first lateral expansion area 406 is in the horizontal extension of the upper holes 401, and a second lateral expansion area 407 is in the horizontal extension of the lower holes 402. Lateral expansions are shown by arrows A1, A'1 and A2, A'2. Reference 403 refers to the outer shape of the damping body 41,42. The inner shape 404 fits within a cylindrical grove belonging to a cylindrical casing 44 of an actuator (see FIG. 9). The dashed line 405 shows the position of an external cylindrical casing of the actuator 44 outside the cylindrical grooves.

Figure 9:
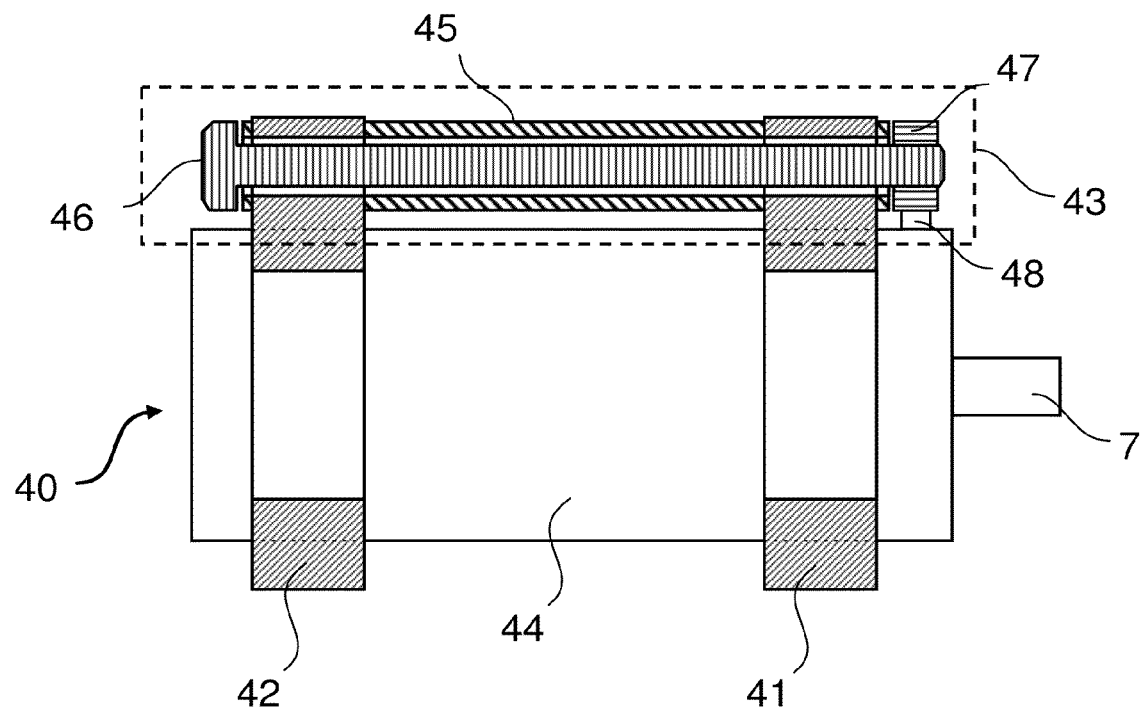
FIG. 9 is a cross-section view of another example actuator, including the damping body of FIG. 8 and another example expanding means, in accordance with another embodiment.

FIG. 9 shows a cross section, along the line Y-Y' and perpendicularly to the plane of FIG. 8, of actuator 40, including the damping bodies 41 and 42 and an expanding mechanism 43. The actuator 40 also includes a cylindrical casing 44 with groves (not shown) where the damping bodies 41 and 42 are inserted. The expanding mechanism 43 is provided to interface with each of holes 401 and 402.

The expanding mechanism 43 includes a bolt 46 and a nut 47. A cylindrical hollow brace 45 can be inserted between the two damping bodies 41 and 42 and can be traversed by the bolt 46. A link 48 allows blocking the rotation of the nut 47 when the bolt 46 is turned. Such a bolt 46 and nut 47 combination can be provided for each hole 401 and 402.

In FIG. 9, the rest position of expansion mechanism 43 is shown. It should be noted that no stress or strain is applied by the expansion mechanism 43.

When the bolt 46 is tightened, then, a lateral expansion of the damping bodies 41 and 42 is created. When a sufficient lateral expansion is obtained the expansion mechanism 43 is in its clamped position.

Preferably, the bolt-nut assembly is designed to have a sufficient expansion with only a quarter of turn of the bolt 46. In certain embodiments, tapered ends of the hollow brace 45 can improve significantly the lateral expansion of the damping bodies 41 and 42.

Figure 10:
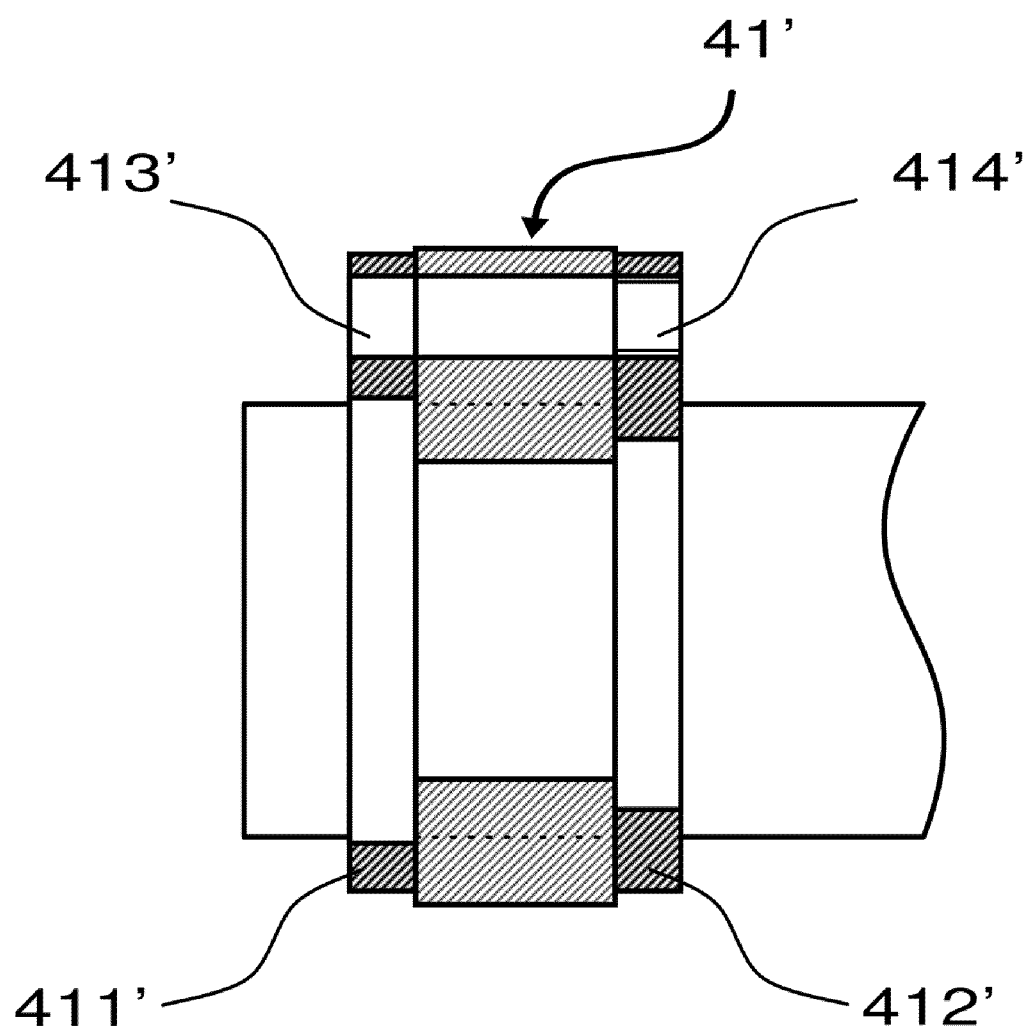
FIG. 10 shows a partial view of the actuator of FIG. 9, including another example damping body.

FIG. 10 shows a partial view of the second embodiment, including an alternative construction 41' of the damping body 41. This alternative construction uses the damping body 41 sandwiched between a first plate 411' and a second plate 412'. The first plate includes a circular hole 413' larger than the bolt diameter in front of each hole 401-402. The second plate 412' includes a threaded hole 414' in which the bolt will be engaged.

An alternative construction 42' of the damping body 42 will be similar except that all holes have a larger diameter than the bolt.

When using this alternative construction, a unique hollow brace 45' (not shown) is preferably used, surrounding the cylindrical casing 44 of the actuator 40 and maintaining the distance between the two damping bodies 41' and 42'.

Figure 11:
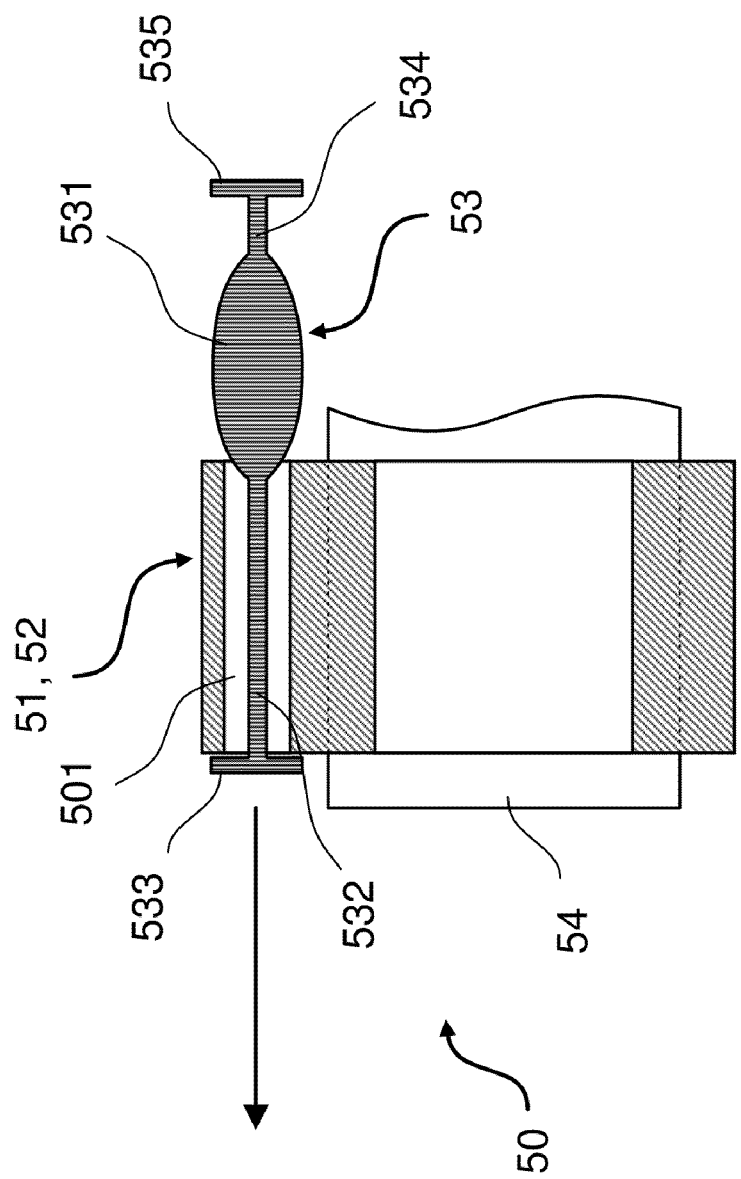
FIG. 11 is a diagram illustrating another example actuator, including another example damping body and another example expanding means, in accordance with one embodiment.

FIG. 11 shows a partial view of still another example actuator 50 including damping bodies 51 and 52 and expanding mechanism 53 in accordance with another embodiment.

The damping bodies 51 and 52 in this example are surrounding the casing 54 of the actuator 50 and are for instance larger than in the previous examples. They can include a large hole 501 in the vicinity of each top end 32a and 34a of the headrail 3. A same large hole can exist in the lower part in the vicinity of each lower lateral surface 32b and 34b. The expanding mechanism 53 can have an axial symmetry and can include an ovoid body 531, the diameter of which can be larger than the large hole 501, linked to a long string 532 on one end and to a short string 534 on the other end. A first end-limit 533 and a second end-limit 535 terminate each string respectively.

FIG. 11 shows the expansion mechanism in a rest position. Clamping of the actuator in the headrail is simply realized by pulling the long string 532. Then, a lateral expansion of the damping body 51,52 is created by the expansion mechanism 53. The clamped position is preferably reached when the ovoid body 531 is centred in the large hole 501. Unclamping of the actuator 50 is achieved by pulling the short string 534.

Figure 12:
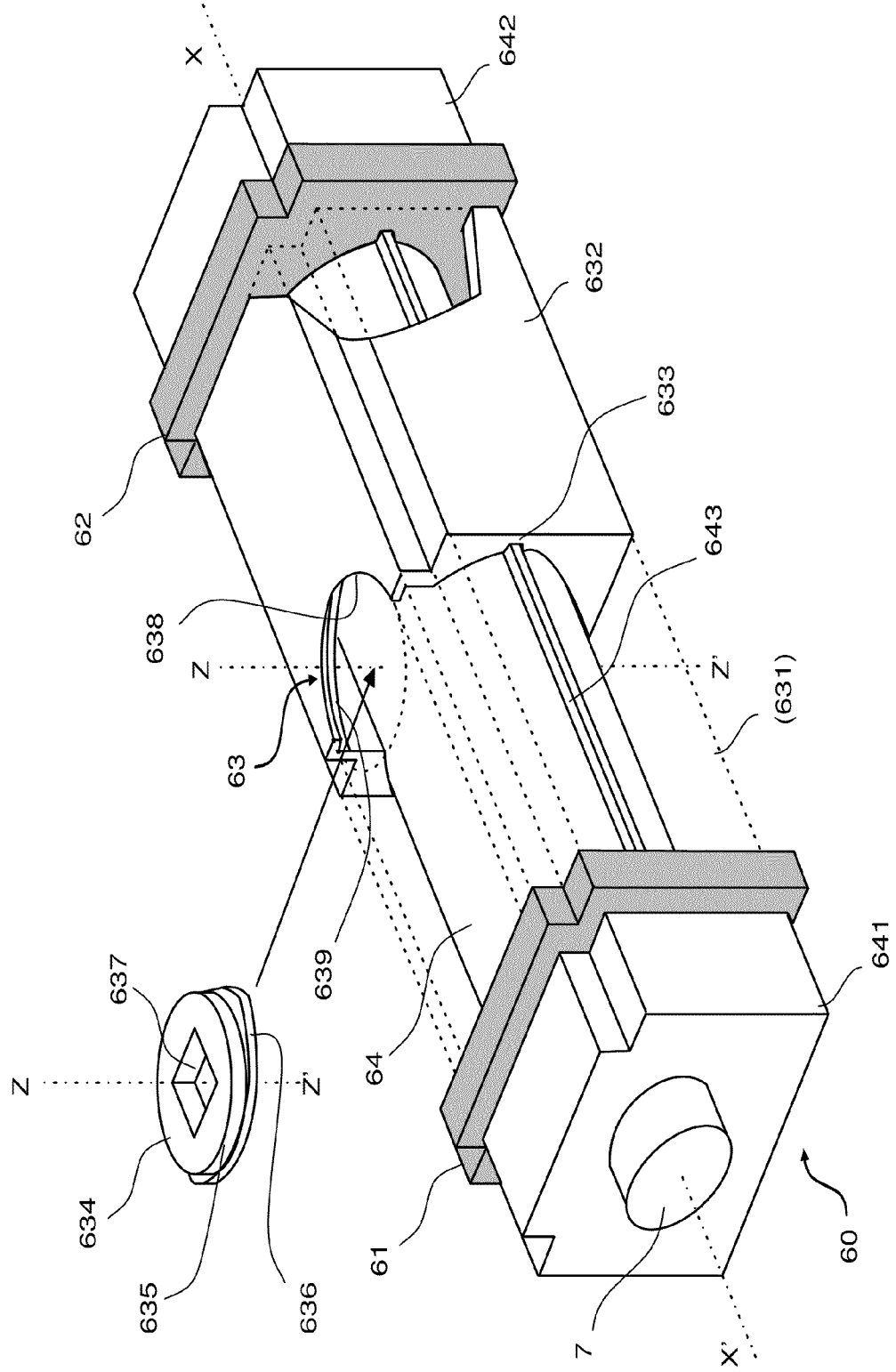
FIG. 12 is a diagram illustrating another example actuator, including another example damping body and another example expanding means, in accordance with one embodiment.

FIG. 12 is a diagram illustrating another example actuator 60, including further example damping bodies 61 and 62 and another example expanding mechanism 63 in accordance with one embodiment. The actuator 60 includes a motor (not shown) and gear (not shown) with a cylindrical housing 64, a first rectangular blocking section 641 at a first end and a second rectangular blocking section 642 at the second end. A shaft output (not shown) is at the first end and is connected to the shaft 7.

In this example embodiment, expanding mechanism 63 includes the two outer casings and the rotating unit. The first damping body 61 is inserted between the first blocking body 641 and a first outer casing 631 (shown with dotted lines). The second damping body is inserted between the second blocking body and a second outer casing 632. Each outer casing has a rectangular profile, includes an axial grove 633 and is movable axially, guided by an axial protrusion 643 on each side of the cylindrical housing 64. A rotating unit 634 that rotates around a vertical axis Z-Z' is located in the central part of the actuator 60. The rotating unit 634 is shown in its rest orientation. It includes a disk 635 coaxial with Z-Z' superposed and mechanically linked with an eccentric body 636 larger than the disk. A square hole 637 allow to insert a tool to create a rotation around the Z-Z' axis.

The rotating unit is maintained downwards by the motor housing 64 and upwards by a circular collar 638 belonging to the upper face of each outer casing. Under this collar, an elliptic track 639 machined in the outer casing has substantially the same elliptic shape than the eccentric 636, the larger axis being perpendicular to X-X' and Z-Z'. The eccentric 636 is in contact with the elliptic track. When the rotating unit rotates, both outer casings 631 and 632 are pushed away by the eccentric and jam each damping body. As a result, the damping bodies are expanded in a lateral direction and the actuator is clamped if it is in the headrail.

Preferably, two small notches (not shown) disposed axially in the elliptic tracks give a stable position of the rotating unit (clamped position) when it is turned by 90° from the rest orientation (rest position).

Figure 14:
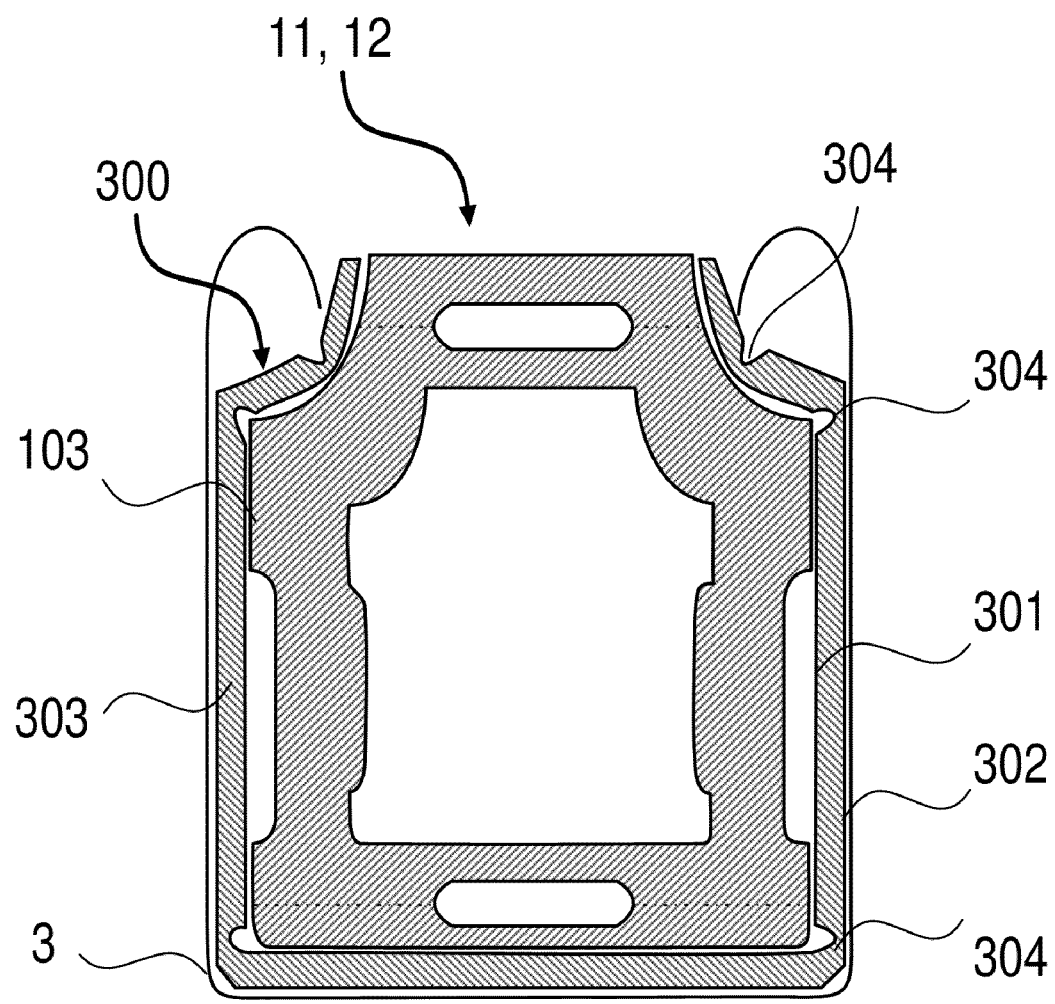
FIG. 14 is a diagram illustrating a cross-section of an actuator that includes an intermediary accessory and a damping means inserted in a headrail in accordance with another example embodiment.

Accordingly, various damping bodies can be used depending on the kind of headrail. Only their outer shape has to change. Due to the number of different shapes of headrail, inserting an intermediary accessory between the damping body and the headrail can also be used as a mixed approach, as depicted by FIG. 14. Intermediary accessory 300 has an inner shape 301 that fits with the outer shape 103 of, e.g., the damping means 11 or 12. The outer shape 302 of the intermediary accessory fits with the profile of headrail 3. When using such intermediary accessories, it is preferred to manufacture a unique-type damping body for all uses and a plurality of accessories fitting both with this unique-type damping body and with the different shapes of headrail.

The intermediary accessory can be made of a rigid plastic body 303 and can contain articulations 304 that allow a lateral expansion when the damping body extends laterally. The intermediary accessory can improve the sliding ability of the actuator in the headrail before it is clamped.

A tool that can impart an axial action can be used for going from a rest position to a clamped position and conversely. This can be useful when the actuator is a motor to be dismounted and mounted on a side end of the headrail, as shown in FIG. 1, e.g., during a maintenance operation. For instance, the extraction hole 206 on each spike allows inserting a tool to pull back the spike in its rest position.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. An actuator to be inserted in a headrail of a window covering, comprising:
   a headrail;
   a motor;
   an expandable damping body configured to reduce vibrations from the motor to a headrail when the damping body is expanded against the headrail; and
   an expanding mechanism having, when coupled to the damping body, a rest position and a clamped position;
   wherein in the rest position, the expanding mechanism is configured not to expand the damping body against the headrail; and wherein in the clamped position, the expanding mechanism is configured to expand the damping body against the headrail.

2. The actuator of claim 1, wherein the expanding mechanism comprises a spike, and wherein the damping body comprises a hole configured to receive the spike.

3. The actuator of claim 2, wherein the spike comprises an expanded section of a width that is wider than a width of the hole.

4. The actuator of claim 1, wherein the expanding mechanism comprises a plurality of spikes, and wherein the damping body comprises a plurality of holes configured to receive the spikes.

5. The actuator of claim 1, further comprising a plurality of damping bodies, and wherein the expanding mechanism is configured to expand each of the plurality of damping bodies against the headrail.

6. The actuator of claim 1, wherein the damping body comprises at least one lateral expansion area in which the damping body is expanded against the headrail.

7. The actuator of claim 1, wherein the damping body includes at least an upper lateral expansion area and a lower lateral expansion area in which the damping body is expanded against the headrail.

8. The actuator of claim 7, wherein the damping body includes an upper lateral expansion area and a lower lateral expansion area on each side of the damping body in which the damping body is expanded against the headrail.

9. The actuator of claim 1, wherein the damping body is inserted and axially maintained in a groove of the actuator.

10. The actuator of claim 1, wherein the expanding mechanism is configured to be moved axially from the rest position to the clamped position.

11. The actuator of claim 10, wherein the damping body comprises a hole, wherein the expanding mechanism comprises a tapered section, an expanded section and a constant-width section, the expanded section comprising a width greater than a width of the hole and greater than a width of the constant-width section, and wherein the damping body and expanding mechanism are coupled such that axial movement of the expanding mechanism from the rest position to the clamped position moves the expanded section of the expanding mechanism into the hole of the damping body thereby expanding the damping body against the headrail.

12. The actuator of claim 11, wherein expansion of the damping body is in a lateral direction.

13. The actuator of claim 11, wherein the hole of the damping body is a flat hole and the expanded section of the expanding mechanism is flat.

14. The actuator of claim 11, wherein the expanding mechanism further comprises a mechanical stop configured to limit axial movement of the expanding mechanism.

15. A powered window covering system, comprising:
a headrail; and
an assembly to be inserted in the headrail, the assembly comprising
an actuator,
an expandable damping body between the actuator and headrail, the damping body configured to reduce vibrations from the actuator to the headrail when the damping body is expanded against the headrail, and
an expanding mechanism having, when coupled to the damping body, a first position and a second position;
wherein in the first position, the expanding mechanism is configured not to expand the damping body against the headrail; and
wherein in the second position, the expanding mechanism is configured to expand the damping body against the headrail.

16. The powered window covering system of claim 15, wherein the headrail has a U-shaped cross section.

17. The powered window covering system of claim 15, wherein the expanding mechanism comprises a spike, and wherein the damping body comprises a hole configured to receive the spike.

18. The powered window covering system of claim 17, wherein the spike comprises a tapered section, an expanded section and a constant-width section, the expanded section comprising a width greater than a width of the hole and greater than a width of the constant-width section, and wherein the damping body and expanding mechanism are coupled such that axial movement of the expanding mechanism from the first position to the second position moves the expanded section of the spike into the hold of the damping body thereby expanding the damping body against the headrail.

19. The powered window covering system of claim 18, wherein expansion of the damping body is in a lateral direction.

20. The powered window covering system of claim 18, wherein the hole of the damping body is flat and the expanded section of the spike is flat.

* * * * *